2,237,282

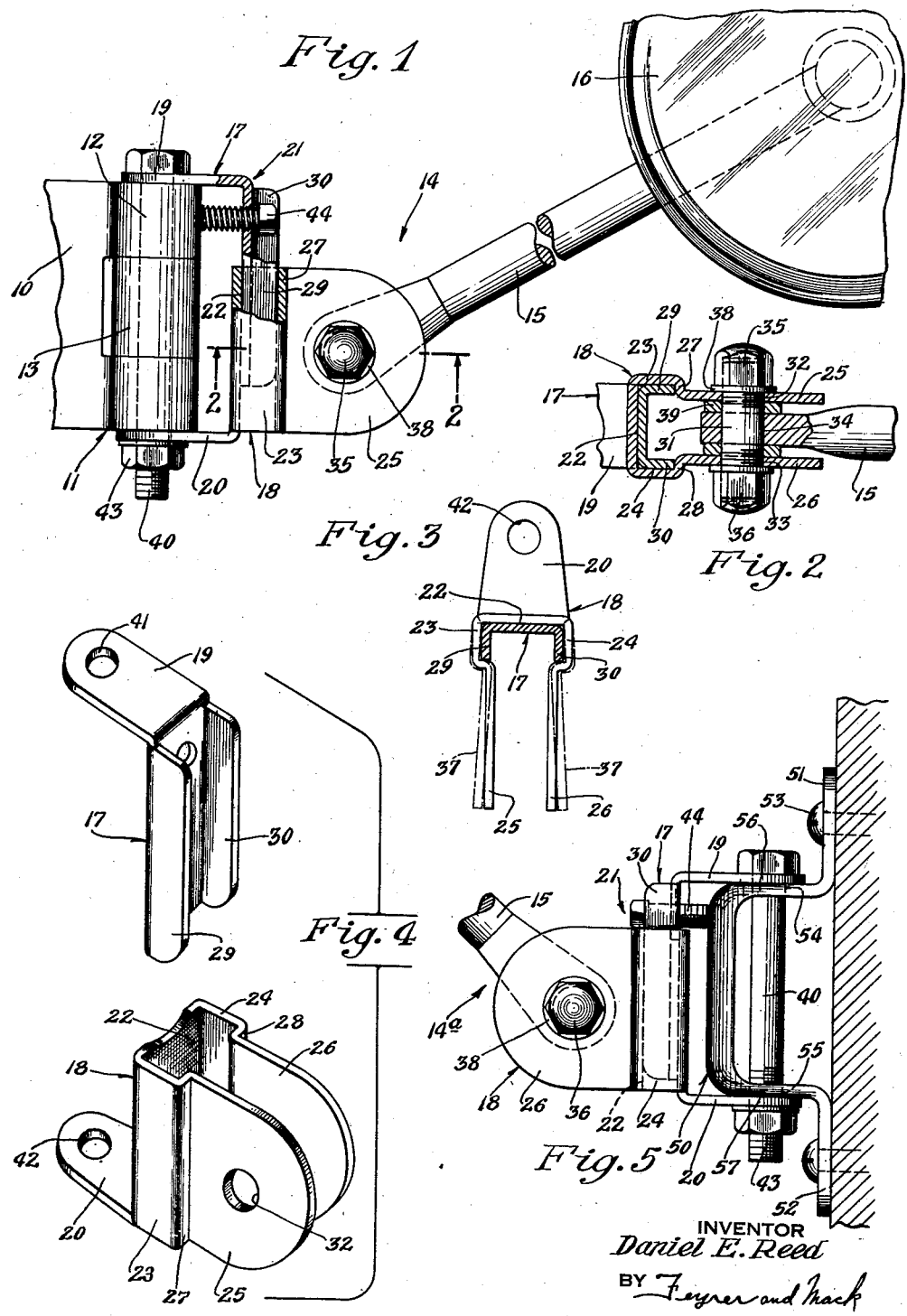
April 1, 1941. D. E. REED 2,237,282
MOUNTING FOR REARVIEW MIRRORS AND THE LIKE
Filed Sept. 26, 1939
INVENTOR
Daniel E. Reed
ATTORNEYS Patented Apr. 1, 1941

UNITED STATES PATENT OFFICE 2,237,282

MOUNTING FOR REAR-VIEW MIRRORS AND THE LIKE

Daniel E. Reed, Norwalk, Conn., assignor to Yankee Metal Products Corp., Norwalk, Conn., a corporation of New York Application September 26, 1939, Serial No. 296,582

7 Claims. (Cl. 248—205)

This invention relates to an improved mounting, particularly adapted for securing a rear-view mirror or the like relative to a vehicle.

It is an object of the invention to provide a mounting for a mirror which is simple in construction, is most effective in its operation and which may be very easily applied to a vehicle.

It is another object of the invention to provide a mirror mounting which is adjustable and which is adapted to be secured to supports of divers kinds and sizes on a vehicle.

In the attainment of the above and other objects of the invention which will hereinafter appear, there is provided as a feature of the invention a mounting which includes a clamp having telescopically associated sections adjustable to enable the embracing by the clamp of supports of divers sizes, and having a most simple and effective means for not only maintaining the clamp in various selected positions of adjustment but also for securing an arm for a mirror relative to the clamp.

A feature related to the above resides in the provision of an adjustable clamp which is adapted to be associated with a vehicle door hinge by a pin which serves not only to connect a clamp to the hinge but serves also as the pintle for the hinge.

Another related feature of the invention resides in the provision of a mounting for a rear-view mirror, which includes a bracket adapted to be secured to a vehicle, as to the side thereof, and an adjustable clamp adapted to embrace the bracket and to support a projecting arm for a mirror or the like.

A further feature of the invention resides in the provision of a mirror arm supporting clamp which includes a pair of telescopically associated sections, one of the sections being provided with a channel-shaped guide for maintaining the sections against adverse lateral displacement relative to each other as they are moved longitudinally relative to each other to adjust the size of the clamp.

Other objects and features will hereinafter appear.

In the drawing:

Figure 1 is a side view, partially in section, showing the mounting provided by the present invention associated with the hinge of a vehicle door.

Fig. 2 is a sectional view taken on the line 2—2 of Fig. 1.

Fig. 3 is a detail view, similar to Fig. 2, but with certain of the parts omitted, to illustrate the manner in which the telescoping sections of the clamp are associated and the manner in which the outer section is squeezed against the inner section to effectively maintain the clamp in divers adjusted positions.

Fig. 4 is an exploded perspective view showing the telescoping sections of the clamp.

Fig. 5 is a view similar to Fig. 1, but showing the mounting associated with a vehicle by means of a bracket instead of by means of a vehicle door hinge.

Before describing the present improvements and mode of operation thereof in detail it should be understood that the invention is not limited to the details of construction and arrangement of parts shown in the accompanying drawing, which are merely illustrative of the present preferred embodiments, since the invention is capable of other embodiments, and the phraseology employed is for the purpose of description and not of limitation.

Referring more particularly to the drawing and first to Figs. 1-4 there is shown a portion of a vehicle door 10 with which a hinge 11 of conventional construction is associated to pivotally connect the door to the door post, not shown. As is likewise conventional, the hinge 11 includes a pair of spaced ears 12 fixed to and movable with the door, and an ear 13 fixed to the door post.

Associated with this hinge 11 is a novel mounting 14, constituting the subject matter of the present invention, and particularly adapted to support a projecting arm 15 for a rear-view mirror 16 relative to the vehicle.

This novel mounting 14 includes inner and outer telescoping sections 17 and 18 having clamping jaws 19 and 20 respectively, and together providing a substantially C-shaped clamp 21 adapted to embrace the upper and lower ends of the hinge 11.

Of importance and as shown the outer section 18 is provided with a guide channel 22 defined by side walls 23 and 24 terminating in longitudinally extending laterally spaced ears 25 and 26, adapted to confine and associate therewith for relative longitudinal sliding movement the inner section 17. Preferably, the side walls 23 and 24 are advantageously formed with angularly offset portions 27 and 28 providing means cooperable with outwardly extending flanges 29 and 30 on the inner member 17 for effectively maintaining the latter against adverse lateral movement out of the guide channel 23 and toward the ears 25 and 26.

With this construction the clamp 21 may be readily adjusted to divers selected sizes to embrace hinges of varying longitudinal extent, and both during and after the adjustment of the sections 17 and 18 the latter are positively maintained against adverse lateral movement relative to each other in all directions.

In associating the mirror 16 and supporting arm 15 with the clamp 21, the arm is inserted between the ears 25 and 26 and is effectively secured thereto by a stud 31 which passes through alined holes 32 and 33 in the ears and a hole 34 adjacent the end of the arm, and which, as shown, may be threaded at opposite ends to receive nuts 35 and 36.

Of particular importance, when connecting the mounting 14 with a vehicle door hinge the clamping jaws 19 and 20 are adjusted to embrace the hinge 11 by sliding the inner and outer sections 17 and 18 longitudinally relative to each other and the clamp is then effectively locked in adjusted position by tightening either one or both of the nuts 35 and 36 to squeeze the side walls 23 and 24 of the outer section 18 firmly against the flanges 29 and 30 of the inner section 17. The distortion of the side walls 23 and 24 of the outer section 18 to effectively clamp the inner section 17 when the ears 25 and 26 are squeezed together is graphically illustrated in Fig. 3 where the normal or expanded position of the walls is shown in dotted lines 37 and where the clamping position of the walls is shown in full lines.

Lock washers 38 preferably are provided to prevent inadvertent loosening of the nuts, caused by vibration of the vehicle, and washers 39 of fiber, rubber or the like may be inserted between the ears 25 and 26 and the end of the mirror arm 15 to more effectively maintain the latter in a given adjusted position on the pivotal support provided by the stud 31.

To complete the connection of the mounting 14 and the hinge 11, a bolt 40 is utilized which passes through alined holes 41 and 42 in the clamping jaws 19 and 20 and through the hinge 11 and which takes the place of the usual and conventional hinge pintle. A nut 43 may be advantageously used to most securely hold the bolt in position and thus maintain the mounting in association with the hinge. Also, preferably and as shown, a set screw 44 may be utilized to maintain the mounting against adverse turning movement relative to the support provided by the ears of the door hinge 11.

It is to be particularly noted that the mounting 14, provided by the present invention, is most simple in construction and effective in its operation, the longitudinally slidable sections 17 and 18 of the clamp 21 being at all times positively maintained against adverse lateral displacement relative to each other, as might otherwise be caused by vibration of the vehicle, and the clamp being secured in adjusted position by the same means which serves to connect the mirror arm 15 therewith.

While as shown in Fig. 1, the clamp 21 is shown as associated with the hinge 11 of a vehicle door, it is to be understood that the same clamp may be effectively associated with other supports on the vehicle. Thus, as illustrated in Fig. 5, a slightly modified mounting 14a may be utilized which includes a bracket 50 of substantially U-shape and formed with angularly offset ends 51 and 52 adapted to be secured to the side of the vehicle as by screws 53.

The clamp 21 may be associated with the bracket 50 in the same manner as described above in connection with the door hinge. In this case, however, instead of passing through a door hinge, the bolt 40 passes through alined holes 54 and 55 in the outwardly extending portions 56 and 57 of the bracket. In all other particulars, the construction and operation of the modified mounting 14a are identical with that of the mounting 14 first described.

Variations and modifications may be made within the scope of this invention and portions of the improvements may be used without others.

Having thus described the invention, what is claimed as new is:

1. An adjustable mounting for attaching a mirror to a vehicle, comprising a substantially C-shaped clamp adapted to embrace a support on said vehicle; inner and outer sections in said clamp, slidable relative to each other to adjust said clamp to divers selected sizes; an arm for a mirror; side walls on said outer section, defining a guideway for said inner section and terminating in laterally spaced ears with free ends; means in said guideway for maintaining said inner section against movement toward said free ends; and a single means intermediate said ears for pivotally connecting said arm to said outer section independently of the inner section and for drawing the said walls of said outer section into firm gripping engagement with said inner section.

2. In a device of the character described, a first member having a longitudinal sliding portion and a laterally extending jaw portion; a second member having a longitudinal sliding portion providing a guide channel for confining said first named sliding portion against adverse lateral movement in all directions, and having a laterally extending jaw portion opposed to said first named jaw portion; a pair of ears on said second member; a projecting arm connected to said ears on said second member independently of said first member; and means for drawing said ears toward each other to distort said second member and clamp the first member against relative longitudinal movement in said guide channel.

3. A mounting of the character described, comprising first and second members respectively provided with means to facilitate their connection to a support; side walls on said first member, defining a guide channel for embracing said second member and guiding the latter in longitudinal sliding movement relative thereto; an element-supporting arm; and a single means for drawing said side walls into secure gripping relationship with said second member and for connecting said arm directly only to said first member independently of said second member.

4. A mounting of the character described, comprising a first member provided with means to facilitate its connection to a support; a second member slidable longitudinally relative to said first member, provided with means to facilitate its connection to a support; side walls on said first member, defining a guide channel for embracing said second member and guiding the latter in its sliding movement; ears projecting from each of said side walls, said ears having aligned apertures therein; angularly offset portions intermediate said side walls and said ears for arresting lateral movement of said second member out of said channel and toward said ears, said offset portions and said side walls on the one hand and said second member on the other hand being formed to maintain said first and second members against turning movement relative to each other; an element-supporting arm having a portion extending between said ears; and a single means including a stud passing through aligned apertures in said ears and said extending portion, for drawing said side walls into secure gripping relationship with said second member and for pivotally connecting said arm directly only to said first member independently of said second member.

5. A device for clamping and supporting a rear-view mirror relative to a vehicle door hinge, comprising a first telescoping member; a second telescoping member confining said first member against lateral movement relative thereto in all directions, and having an open longitudinal side; a projecting arm for supporting a rear-view mirror or the like; opposed laterally extending jaws on said members having apertures therein for receiving a pin passing through a hinge located between said jaws; and a single means associated with said open side for securing said projecting arm directly only to said outer member independently of the inner member and for drawing the outer member into firm clamping engagement with said inner member.

6. In a device for supporting a rear-view mirror or the like relative to a vehicle, comprising a bracket adapted to be secured to said vehicle and having at least one pin receiving aperture therein; a substantially C-shaped clamp constituted by members slidable longitudinally relative to each other, having opposed jaws with apertures therein, adapted to locate said bracket therebetween; a pin passing through said apertures in said jaws and said bracket; cooperating means on said longitudinally slidable members for confining the same against adverse lateral movement relative to each other in all directions; a supporting arm for a rear-view mirror or the like; and a single means for securing said arm directly only to said outer member independently of said inner member and for distorting the outer member into firm clamping engagement with said inner member.

7. A device of the character described, comprising an inner telescoping member having a laterally extending jaw; a pair of laterally spaced ears; an outer telescoping member having side walls with free ends respectively terminating in said ears and having a laterally extending jaw opposed to said first named jaw and cooperable therewith to locate a support therebetween; a guideway defined by said walls of the outer member for confining the inner member and having a portion for arresting adverse lateral movement of said inner member relative toward said free ends; a projecting supporting arm; and means intermediate said ears for drawing said walls into clamping engagement with said inner member and for securing said arm directly only to said outer member independently of the inner member.

DANIEL E. REED.